United States Patent
Ijuin et al.

[11] Patent Number: 5,413,426
[45] Date of Patent: May 9, 1995

[54] RECORDING APPARATUS

[75] Inventors: Kazuya Ijuin, Tokyo; Michio Kasuya, Yokohama; Shinnichiro Otsuki, Kawasaki, all of Japan

[73] Assignee: Canon Kabushiki Kaisha, Tokyo, Japan

[21] Appl. No.: 889,398

[22] Filed: May 28, 1992

[30] Foreign Application Priority Data

May 29, 1991 [JP] Japan .............. 3-152287

[51] Int. Cl.⁶ .............. B41J 15/16; B41J 11/70
[52] U.S. Cl. .............. 400/621; 346/24; 83/524
[58] Field of Search ............... 400/621, 621.1, 621.2, 400/185–187, 636, 636.1, 636.2, 639, 639.1; 101/224, 226; 346/24; 83/349, 508, 524

[56] References Cited

U.S. PATENT DOCUMENTS 5,041,845 8/1991 Ohkubo et al. .............. 400/621 X

FOREIGN PATENT DOCUMENTS

| | | |
|---|---|---|
| 0055276 | 5/1981 | Japan .............. 400/621 |
| 59-114964 | 7/1984 | Japan . |
| 60-12464 | 1/1985 | Japan . |
| 60-12198 | 3/1985 | Japan . |
| 60-82375 | 5/1985 | Japan . |
| 60-187571 | 9/1985 | Japan . |
| 61-116465 | 6/1986 | Japan . |
| 0092878 | 4/1987 | Japan .............. 400/621 |
| 62-215466 | 9/1987 | Japan . |
| 62-244866 | 10/1987 | Japan . |
| 1238969 | 9/1989 | Japan .............. 400/621 |
| 3284962 | 12/1991 | Japan .............. 400/621 |
| 2171082 | 8/1986 | United Kingdom . |

*Primary Examiner*—Edgar S. Burr
*Assistant Examiner*—Christopher A. Bennett
*Attorney, Agent, or Firm*—Fitzpatrick, Cella, Harper & Scinto

[57] ABSTRACT

During the forward driving of a recording motor, a platen roller is forwardly rotated and a de-curl shaft is rotated so as to bear against a recording sheet and at this time, a cutter is not driven. During the reverse driving of the recording motor 31, the cutter 17 is first driven to cut the recording sheet 14, whereafter the platen roller 15 is reversely driven and the de-curl shaft 27a becomes spaced apart from the recording sheet 14.

26 Claims, 11 Drawing Sheets

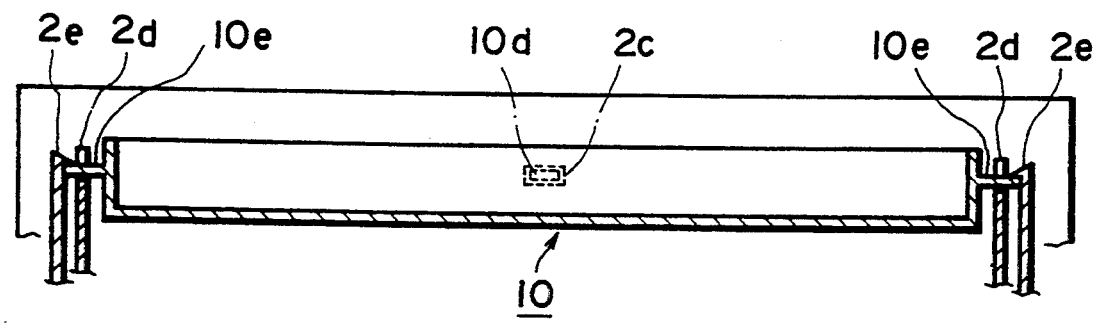
F I G. 7
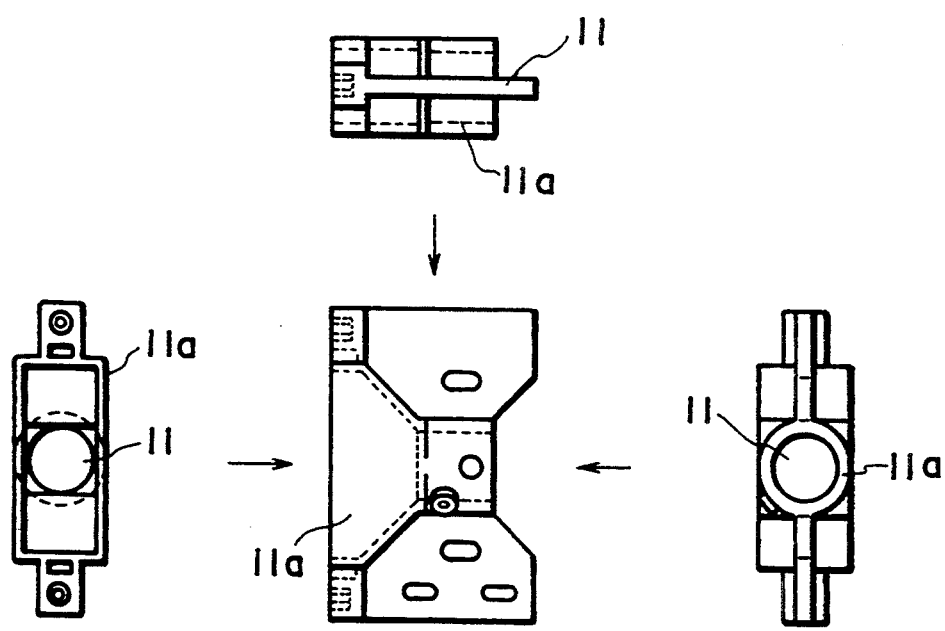
F I G. 8

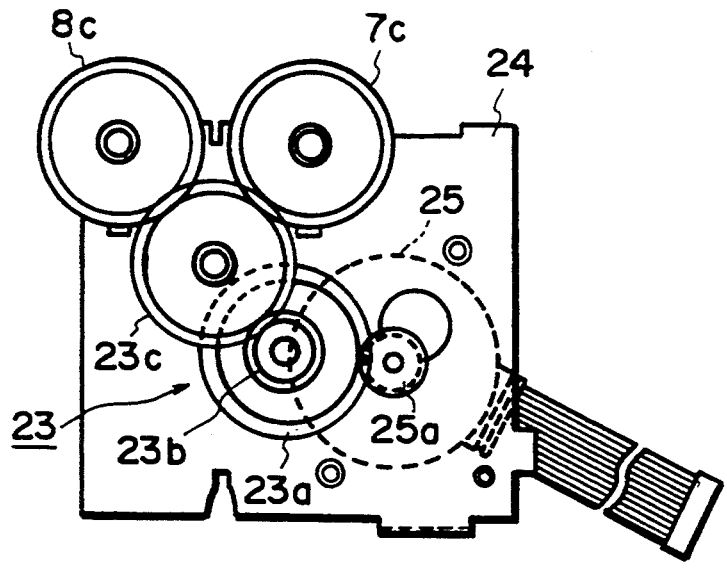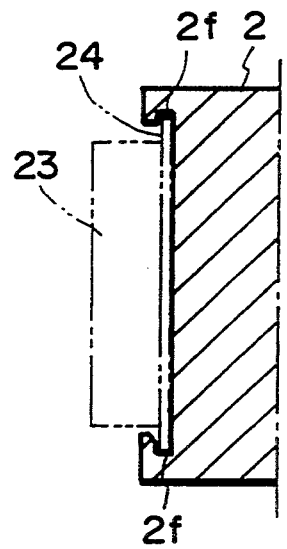
FIG. 9A   FIG. 9B
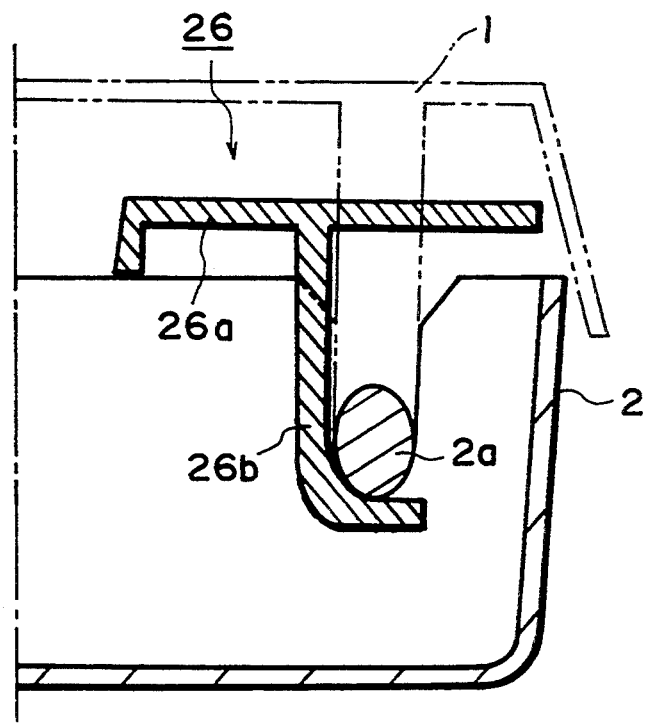
FIG. 10

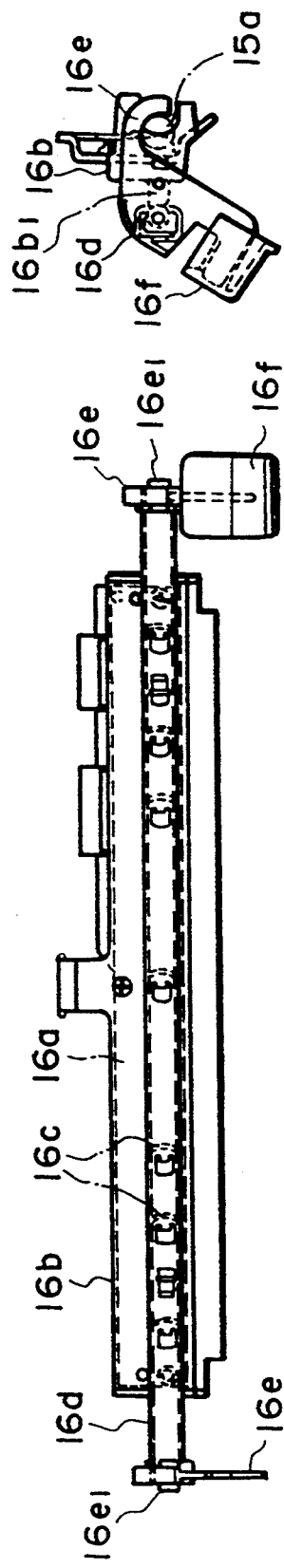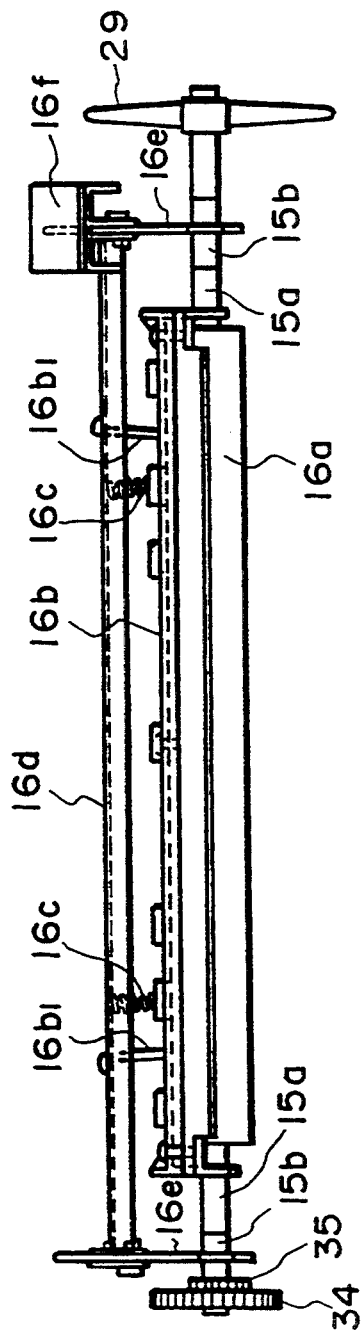
FIG. 12A
FIG. 12B
FIG. 12C

RECORDING APPARATUS

BACKGROUND OF THE INVENTION

1. Field of the Invention

This invention relates to a recording apparatus for use in a facsimile apparatus, a printer or the like, and more particularly to a recording apparatus in which the number of parts can be decreased to thereby achieve a reduction in cost.

2. Related Background Art

A facsimile apparatus comprises an original reading system and a recording system. The original reading system conveys an original by original conveying rollers and read information written on the original by an optical system, and converts the read information into an electrical signal and transmits it. The recording system, upon reception of the electrical signal, conveys a recording sheet by a platen roller and effects recording conforming to an image signal by a recording head, and cuts the sheet after recording by a cutter and discharges the cut sheet. The original conveying rollers are driven by a reading motor, the platen roller is driven by a recording motor, and the cutter is driven by driving the reading motor in a reverse direction.

In facsimile apparatuses now, compactness and low prices are desired and the utmost decrease in the number of parts is required.

For the requirement for the decrease in the number of parts, in a construction wherein the cutter is driven by the reading motor as in the prior art, the location at which the reading system is provided and the location at which the cutter is provided are distant from each other and therefore, numerous drive force transmitting members have been required for transmitting the drive force of the reading motor. In contrast, if the cutter can be driven by the recording motor provided near the cutter, it will become possible to decrease the number of drive force transmitting members.

However, it is necessary that the recording motor drive the platen roller in forward and reverse directions by forward and reverse driving. That is, the platen roller is rotated in the forward direction to thereby convey the recording sheet in the recording direction, and after the recording sheet is cut by the cutter, the platen roller is rotated in the reverse direction to return the cut end of the sheet to a recording position. Thus, if an attempt is made to drive the cutter by the reverse driving of the recording motor, the driving of the cutter and the return conveyance of the recording sheet will be effected at a time and the control of the operation timing thereof will become complicated.

For example, Japanese Patent Publication No. 60-12198 shows an example in which the cutter is driven by the reverse rotation of the recording motor. However, in order that the return operation of the recording sheet may not be performed during the cutting by the cutter, it is necessary that the recording motor and the platen roller be connected together through an electromagnetic clutch and the electromagnetic clutch be ON-OFF-controlled in timed relationship with the cutting operation during the reverse rotation of the recording motor, and this has led to the complication of a control system.

SUMMARY OF THE INVENTION

The present invention intends to solve the above-noted problem peculiar to the prior art and the object thereof is to provide a driving mechanism for a cutter in which without complicating a control system, it is made possible to drive the cutter by a recording motor and it is also made possible to decrease the number of parts and achieve a reduction in cost, and a facsimile apparatus using such driving mechanism for the cutter.

To solve the above-noted problem, the present invention is characterized by the provision of recording means for effecting recording on a recording medium, a conveying member for conveying said recording medium, a cutter for cutting the recording medium conveyed by said conveying member, a drive source for driving said conveying member and said cutter, drive transmitting means for transmitting a drive force to said conveying member during the forward driving of said drive source and transmitting a drive force to said conveying member after a predetermined amount of driving during the reverse driving of said drive source, and a one-way clutch which does not transmit a drive force to said cutter during the forward driving of said drive source and transmits a drive force to said cutter during the reverse driving of said drive source.

Also, in addition to said drive transmission, a curl correction member for correcting the curl of the recording medium wound in the form of a roll is rotatably provided, and design is made such that during the forward driving of said drive source, said curl correction member is rotated in a direction to bear against said recording medium and during the reverse driving of said drive source, said curl correction member is rotated away from said recording medium.

Thus, during recording, the drive source is driven in the forward direction to rotate the conveying member in the forward direction and convey the recording medium, thereby effecting recording. At this time, the drive force is not transmitted to the cutter. On the other hand, when after recording, the drive source is driven in the reverse direction, the cutter is driven to cut the recording medium and after this cutting, the drive force is transmitted to the conveying member to drive the recording medium so as to be returned by a predetermined amount. Thus, the cutter can be driven by the drive source which conveys the recording medium. Also, the curl correction member for the recording member is driven by the drive source, whereby the conveyance of the recording medium, the driving of the cutter and the driving of the curl correction member can be accomplished by the single drive source.

BRIEF DESCRIPTION OF THE DRAWINGS

FIG. 7 is an illustration showing a holding mechanism for the optical unit.

FIG. 8 illustrates of a lens holder.

FIGS. 9A and 9B are illustrations of the mounting structure of a reading drive unit relative to an apparatus body cover.

FIG. 10 is an illustration of the mounting structure of a power source unit cover relative to the apparatus body cover.

FIG. 12 which consists of FIGS. 12A, 12B and 12C illustrates recording means and a holding mechanism therefor.

DESCRIPTION OF THE PREFERRED EMBODIMENT

Figure 1:
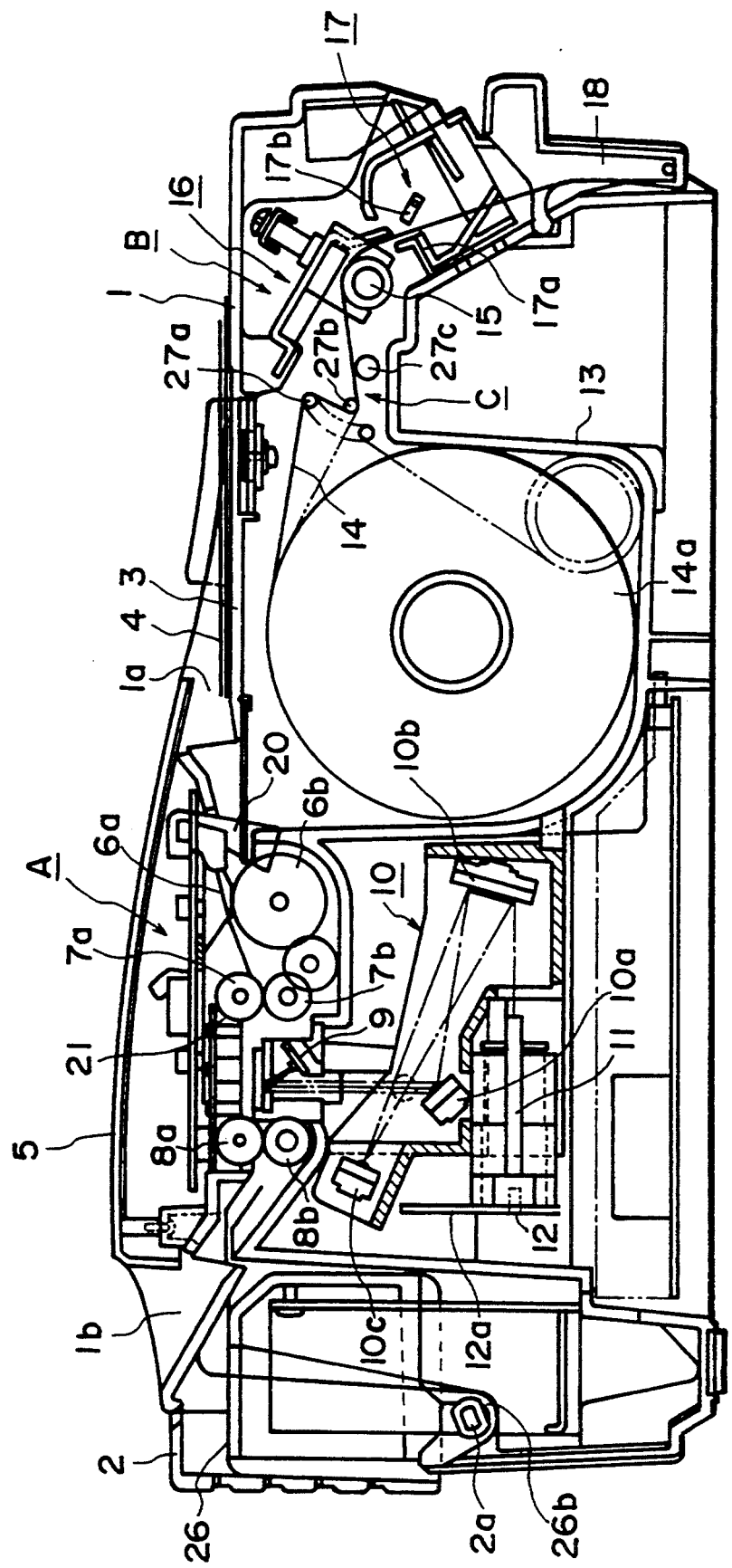
FIG. 1 is a cross-sectional view schematically showing the construction of a facsimile apparatus.

Description will hereinafter be made of an embodiment in which the present invention is applied to a facsimile apparatus. FIG. 1 is a cross-sectional view schematically showing the construction of the entire facsimile apparatus.

In this facsimile apparatus, as shown in FIG. 1, a lid member (a first housing) 1 is mounted on an apparatus body cover (a second housing) 2 for opening and closing about a hinge 2a, and the lid member 1 is designed so as to be restrained on the apparatus body cover 2 by a click mechanism (not shown). A reading apparatus A and a recording apparatus B having a curl correction mechanism C (hereinafter referred to as the "de-curl mechanism C") are contained in a housing comprised of the lid member 1 and the apparatus body cover 2.

(General Construction)

The general construction of the apparatus will first be described briefly. In the reading apparatus A, plural sheets of originals 4 are set on an original supporting table 3 formed on the upper surface of the lid member 1, and an operating unit 5 provided on the lid member 1 is operated, whereby the reading operation is started. Of the plural sheets of originals 4 set on the original supporting table 3, several sheets of originals 4 from the bottom are separated and conveyed one by one by a separating and pressing piece 6a and a separating and conveying piece 6b. The original 4 thus separated is irradiated by a light source while it is conveyed by a pair of conveying rollers 7a and 7b and a pair of discharge rollers 8a and 8b, and the reflected light therefrom is applied to the interior of an optical unit 10 and passes to a photoelectric conversion element 12 such as a CCD via a first reflecting mirror 10a, a second reflecting mirror 10b, a third reflecting mirror 10c and a condensing lens 11 and is converted into an electrical signal thereby. In the case of the copy mode, this signal is transferred to the recording apparatus B, and in the case of the facsimile mode, this signal is transmitted to the recording apparatus of other machine.

In the recording apparatus B, a drop-in type roll holder 13 is provided at a predetermined location in the apparatus body cover 2, and a sheet roll 14a comprising a thermosensitive recording sheet 14 wound in the form of a roll is mounted on the roll holder 13. The recording sheet 14 drawn out from the sheet roll 14a is conveyed by the rotation of a platen roller (a conveying member) 15, and the recording sheet 14 which is a recording medium is bent in the direction opposite to the direction of curl thereof when it passes through the de-curl mechanism C, whereby the curl of the recording sheet is corrected.

At recording means 16, a predetermined image is formed on the recording sheet 14 having had its curl corrected, and after recording, the recording sheet 14 is cut into a page unit by a cutter 17, and the cut sheet is discharged into a discharge stacker 18.

The construction of each portion of the reading apparatus A will now De described in detail.

(Original Conveying Device)

As previously described, the originals 4 set on the original supporting table 3 are separated and conveyed one by one by the separating and pressing piece 6a and the separating and conveying roller 6b which constitute a conveying member, and are further conveyed by the pair of conveying rollers 7a and 7b and the pair of discharge rollers 8a and 8b. The separating and pressing piece 6a, the upper conveying roller 7a and the upper discharge roller 8a are mounted on the lid member 1 side, and the separating and conveying roller 6b, the lower conveying roller 7b and the lower discharge roller 8b are mounted on the apparatus body cover 2 side. The above-described respective conveying members need to press the separating and pressing piece 6a, the upper conveying roller 7a and the upper discharge roller 8a against the separating and conveying roller 6b, the lower conveying roller 7b and the lower discharge roller 8b opposed thereto, in order to convey the originals 4 by the pressing force between the conveying rollers provided above and below.

Figure 2:
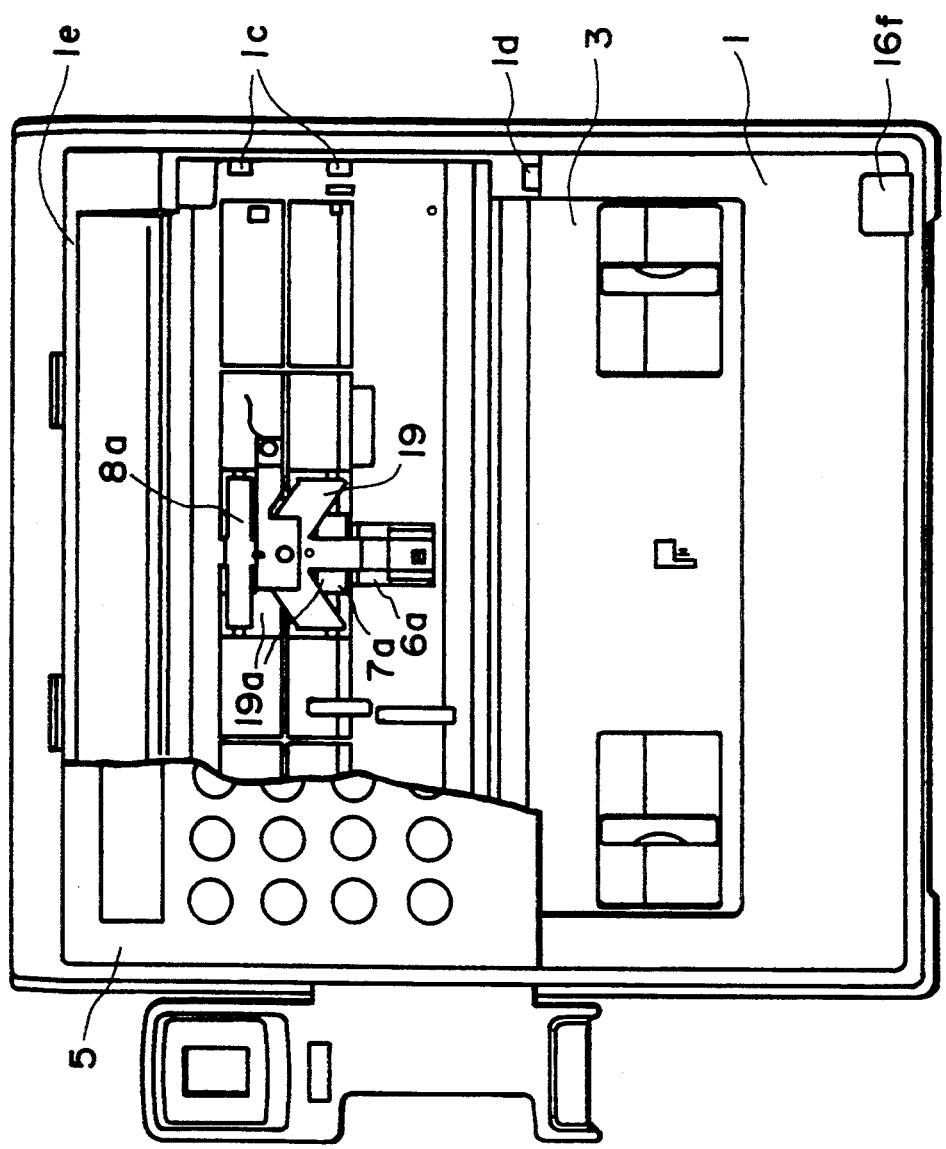
FIG. 2 is an illustration of a conveying and pressing member in an original conveying device.

So, as shown in FIG. 2, a leaf spring (a conveying and pressing member) 19 is screw-set at a predetermined location on the lid member 1, whereby the back side of the separating and pressing piece 6a and the rotary shafts of the upper conveying roller 7a and the upper discharge roller 8a are pressed. The leaf spring 19 has its fore end portion bent vertically or at a predetermined angle relative to the horizontal direction and is designed to press the separating and pressing piece 6a and each rotary shaft effectively. The leaf spring 19 is provided with a V-shaped cut-away portion 19a so as to uniformly press the separating and pressing piece and each rotary shaft against each member without being subjected to any change in the pressing force of its adjacent member.

According to the above-described construction, as compared with the example of the prior art in which pressing members are provided on the lid member 1 side correspondingly to the separating and pressing piece 6a, the upper conveying roller 7a and the upper discharge roller 8a, the number of parts can be decreased to thereby improve the assembly property and realize a low cost.

Figure 3:
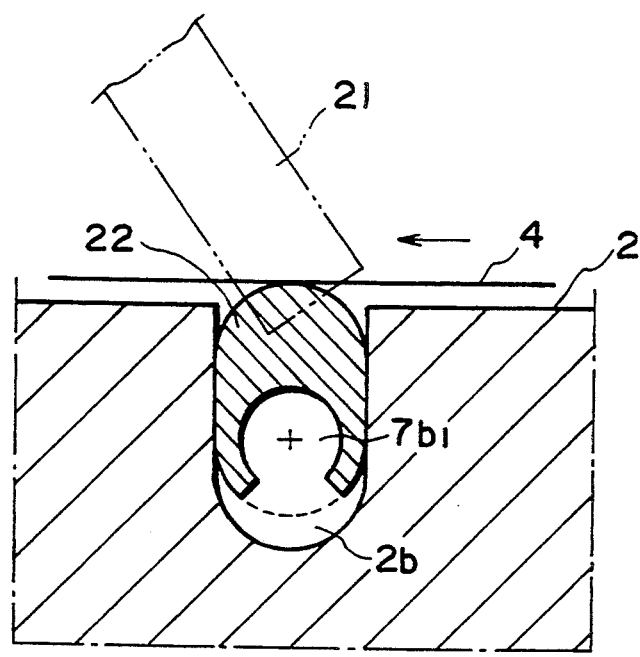
FIG. 3 is an illustration of an original conveyance guide member in the original conveying device.

Also, in FIG. 1, on the lid member 1 side, an original presence detecting sensor 20 for detecting the presence of the original 4 is provided upstream of the separating and pressing piece 6a and the separating and conveying roller 6b with respect to the conveyance direction of the original, and an original end detecting sensor 21 for detecting the leading end and the trailing end of the original 4 is provided downstream of the pair of conveying rollers 7a and 7b with respect to the conveyance direction of the original. Also, the upper surface of the apparatus body cover 2, as shown in FIG. 3, is formed with a groove 2b of U-shaped cross-section into which the lower conveying roller 7b may be dropped and fitted. A predetermined location of the rotary shaft $7b_1$ of the lower conveying roller 7b is formed thinly, and a mold ring (an original guide member) 22 for maintaining the original conveying plane at a predetermined level is fitted into this portion. This mold ring 22 is fitted into the groove 2b to thereby rotatably hold the rotary shaft $7b_1$ of the lower conveying roller 7b.

When the originals 4 are detected by the original presence detecting sensor 20, the originals are separated and conveyed to the downstream side one by one by the separating and pressing piece 6a and the separating and conveying roller 6b. The separating and conveying roller 6b is designed to be intermittently rotated because unless the originals 4 are fed at predetermined intervals, the original end detecting sensor 21 cannot detect the ends of each original 4. In the prior art, the leading end portion of the original 4 might drop into the groove 2b formed in the upper surface of the apparatus body cover 2 to cause jam or the original end detecting sensor 21 on the downstream side could not detect the ends of the original 4 when the original 4 passed between the pair of conveying rollers 7a and 7b, and this led to the instability of the conveying operation. In the present invention, however, the mold ring 22 is fitted into the rotary shaft $7b_1$ of the lower conveying roller 7b, whereby the original conveying plane in the groove 2b can be maintained at a predetermined level to thereby reliably detect the conveyance of the originals 4 and stabilize the conveying operation.

Also, the lid member 1, as shown in FIG. 1, is formed with an insertion port 1a through which the originals 4 are inserted and a discharge port 1b through which the originals 4 after image reading are discharged, and the back side of the lid member 1 serves also as an upper guide surface during the conveyance of the originals. The upper surface of the apparatus body cover 2 serves also a lower guide surface during the conveyance of the originals.

According to the above-described construction, it is unnecessary to discretely provide a guide member for guiding the conveyance of the originals 4 and thus, the number of parts can be reduced. Also, it is unnecessary to assemble the apparatus with the parts thereof classified into units and therefore, the assembly property can be improved. Also, the conveyance path for the originals is disposed between the lid member 1 and the apparatus body cover 2, whereby without the lid member 1 being replaced by a new one, the operating unit 5 can be used in conformity with the user's need. Further, the lid member 1 guides the originals 4 substantially in parallelism to the apparatus body cover 2 and therefore, the flexure of the originals 4 can be corrected.

Figure 4:
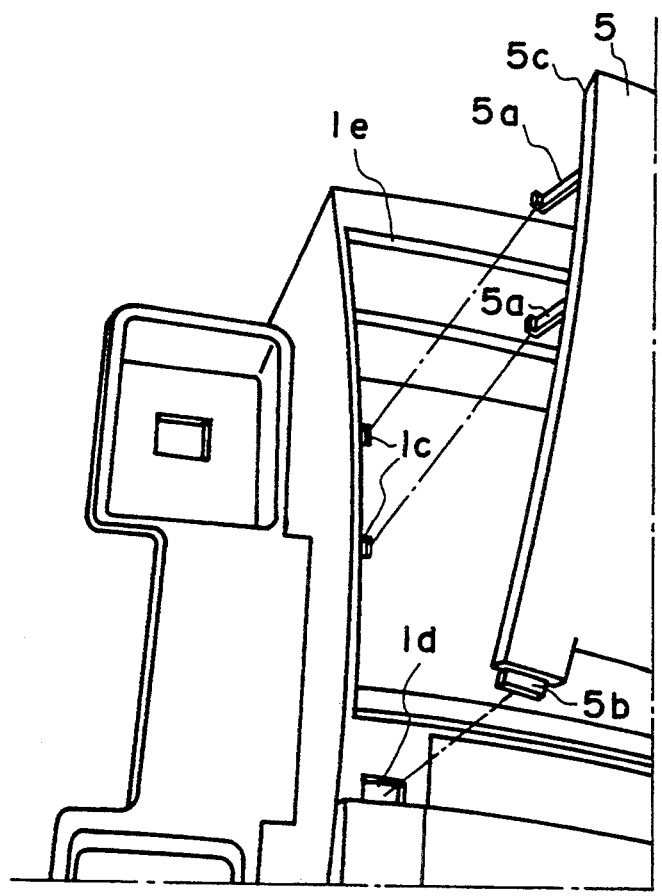
FIG. 4 illustrates that portion of an operating unit which is mounted to a lid member.

Also, the operating unit 5 mounted on the lid member 1, as shown in FIG. 4, is formed with restraining pieces 5a each having a wedge-shaped fore end portion at predetermined locations on the opposite ends of the back of an operating panel, a restraining piece 5b provided on the side edge portion of the insertion port 1a through which the originals 4 are inserted, and an inclined surface 5c conforming to the lid member 1. Also, restraining apertures 1c in which the restraining pieces 5a are restrained, a restraining aperture 1d into which the restraining piece 5b is inserted and an inclined surface 1e conforming to the inclined surface 5c are formed at predetermined locations on the lid member 1. When the operating unit 5 is to be mounted on the lid member 1, the restraining piece 5b is inserted into the restraining aperture 1d and the restraining pieces 5a are inserted into and restrained in the restraining apertures 1c and the inclined surface 5c is brought into coincidence with the inclined surface 1e, whereby the operating unit 5 is mounted on the lid member 1.

Accordingly, the operating unit 5 can be mounted on the lid member without the use of screws and therefore, assemblage is easy and moreover the number of parts can be reduced to thereby achieve a reduction in cost. Also, when the operating unit 5 is used as OEM, versatility can be enhanced.

The original 4 conveyed by the aforedescribed original conveying device is irradiated by the light source 9 using an LED array while it is conveyed between the pair of conveying rollers 7a, 7b and the pair of discharge rollers 8a, 8b, and the reflected light therefrom is applied to the interior of the optical unit 10. The optical unit 10, as shown in 1 FIGS. 5 and 6, comprises reflecting mirrors 10a, 10b, 10c and a condensing lens 11 integrally contained in a housing, and a CCD base plate 12a provided with a photoelectric conversion element 12 is integrally mounted on the optical unit 10 by means of screws.

Figure 6:
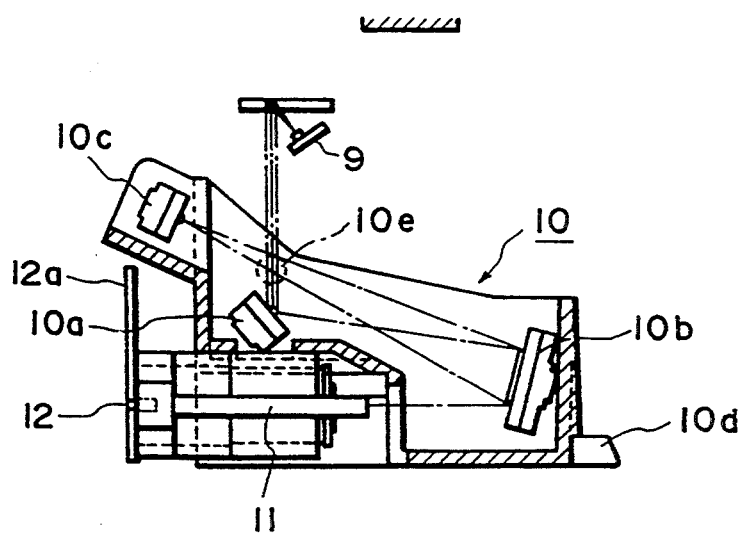
FIG. 6 is a cross-sectional view of the optical unit.

Design is made such that the reflected light from the surface of the original applied to the interior of the optical unit 10, as shown in FIG. 6, is directed to the first reflecting mirror 10a, the second reflecting mirror 10b, the third reflecting mirror 10c and the second reflecting mirror 10b in succession, and passes through the condensing lens 11 to the photoelectric conversion element 12, by which it is converted into an electrical signal.

Figure 5:
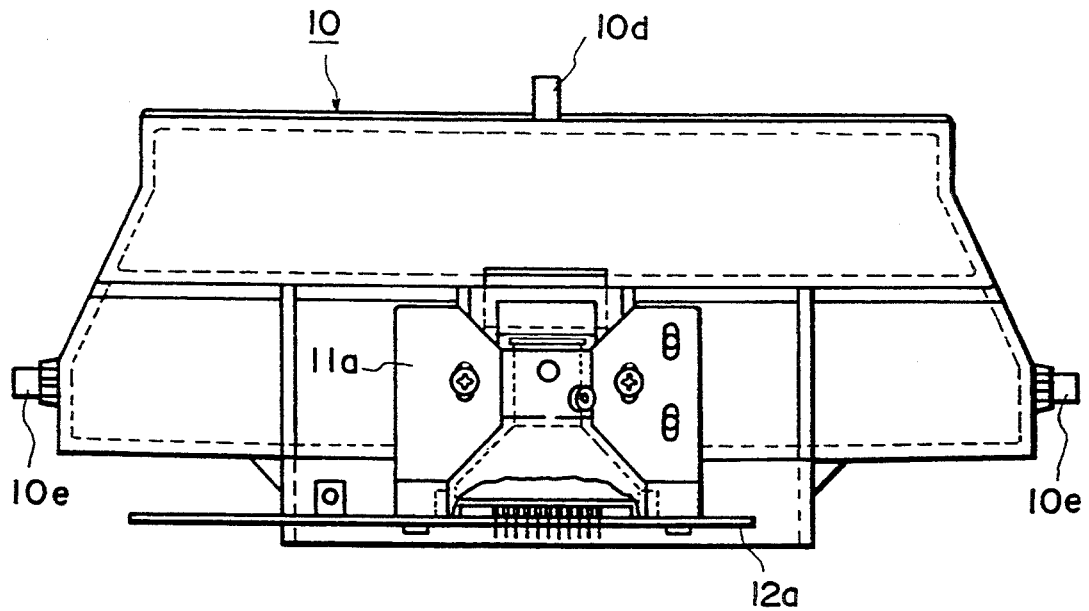
FIG. 5 is an illustration showing a state in which an optical unit is mounted on a CCD base plate.

Also, on the facing of the optical unit 10, a protruding piece 10d is projectedly provided on the fore end portion as viewed in the direction of mounting (the upper side of FIG. 5) and protruding pieces 10e are projectedly provided on both sides as viewed in the lengthwise direction (the horizontal direction in FIG. 5). On the other hand, at predetermined locations on the apparatus body cover 2, as shown in FIG. 7, there are formed a mating aperture 2c into which the protruding piece 10d of the optical unit 10 is fixedly inserted and support apertures 2d for supporting the protruding pieces 10e projectedly provided on the right and left sides. Accordingly, the optical unit 10 is mounted and supported on the apparatus body cover 2 by three points, i.e., the mating aperture 2c and the right and left support apertures 2d.

When the optical unit 10 is to be mounted on the apparatus body cover 2, the protruding piece 10d is first inserted into the mating aperture 2c, and then the protruding pieces 10e on the right and left sides are dropped and fitted into the support apertures 2d, whereby the optical unit can be mounted. Accordingly, assemblage is easy and it is not necessary to mount the optical unit on the apparatus body cover 2 by the use of stepped screws or the like as in the prior art and therefore, the number of parts can be decreased to improve the assembly property and achieve a reduction in cost.

Further, hook-like members 2e formed of synthetic resin are projectedly provided near the outer sides of the support apertures 2d. These hook-like members 2e are constructed so as to come into intimate contact with and support the end surfaces and upper sides of the protruding pieces 10e protruding rightwardly and leftwardly from the support apertures 2d. Accordingly, when the shock of falling, vibration or the like is applied to the apparatus, such shock can be absorbed by the elastic deformation of the hook-like members 2e, and the shock resistance in the holding mechanism of the optical unit 10 can be improved to thereby enhance safety.

Also, the condensing lens 11 contained in the optical unit 10 is supported symmetrically both in the vertical direction and the horizontal direction by a cylinder-like lens holder 11a, as shown in FIG. 8, and this lens holder 11a is closely attached onto the CCD base plate 12a by screws. Accordingly, the condensing lens 11 is supported on a straight line on the optical path relative to the photoelectric conversion element 12. In the present embodiment, polycarbonate is employed as the lens holder 11a.

According to the above-described construction, the condensing lens 11 is supported symmetrically both in the vertical direction and the horizontal direction by the cylinder-like lens holder 11a and therefore, the distortion by a temperature change such as thermal expansion can be minimized and the reading accuracy can be maintained. The cylinder-like lens holder 11a, if it is symmetrical in at least the vertical direction, can suppress the distortion by a temperature change. Also, since the lens holder 11a is mounted on the CCD base plate 12a in intimate contact with the latter while supporting the condensing lens 11, it can prevent the entry of dust or the like into the photoelectric conversion element 12.

FIG. 9A shows a reading drive unit having a gear train 23 for transmitting a drive force from the drive source for the pair of conveying rollers 7a, 7b and the pair of discharge rollers 8a, 8b of the reading apparatus A, said gear train 23 being mounted on a driving base plate 24. A motor gear 25a connected to the drive shaft of a reading motor 25 meshes with a conveying gear 7c and a discharge gear 8c mounted on the ends of the rotary shafts of the lower conveying roller 7b and the lower discharge roller 8b through transmission gears 23a, 23b and 23c rotatably mounted on the driving base plate 24 so that the drive force of the motor may be transmitted. The driving base plate 24 having the gear train 23 mounted thereon is mounted on the apparatus body cover 2 by portions of the upper and lower ends thereof being incorporated into a concave groove 2f vertically formed at a predetermined location of the apparatus body cover 2, as shown in FIG. 9B.

Also, as shown in FIG. 1, a power source unit cover 26 is provided to protect the primary side of the power source unit. This power source unit cover 26 is mounted by the hinge 2a which is the pivot axis of the lid member 1 and apparatus body cover 2 being hitched on the bent portion of a depending piece 26b of L-shaped cross-section provided vertically downwardly relative to the surface 26a of the cover 26, as shown in FIG. 10. The lid member 1 has its arm provided on the opposite side so that it can be opened by only a predetermined angle relative to the apparatus body cover 2, whereby the power source unit cover 26 is prevented from slipping off the hinge 2a when the lid member 1 is opened.

According to the above-described construction, the driving base plate 24 and the power source unit cover 26 can be attached to the apparatus body cover 2 without the use of screws, and assemblage is easy and moreover, the number of parts can be decreased to thereby achieve a reduction in cost.

The construction of each portion of the recording apparatus B in the facsimile apparatus will now be described in detail.

As described previously, the recording sheet 14 drawn out from the sheet roll 14a contained in the roll holder 13 (see FIG. 1) is conveyed by the rotation of the platen roller (conveying member) 15, and has its curl corrected by being bent in the direction opposite to the direction of curl when it passes through the de-curl mechanism C. In the recording means 16, a predetermined image is formed on the recording sheet 14 having had its curl corrected, and the recording sheet 14 after recording is cut into a page unit by the cutter 17, and the cut sheet is discharged into the discharge stacker 18.

The lid member 1 and the apparatus body cover 2 together constitute the facing of not only the reading apparatus A but also the recording apparatus B, and design is made such that when the lid member 1 is opened from the apparatus body cover 2, the recording apparatus A is also opened.

(De-curl Mechanism)

Figure 11:
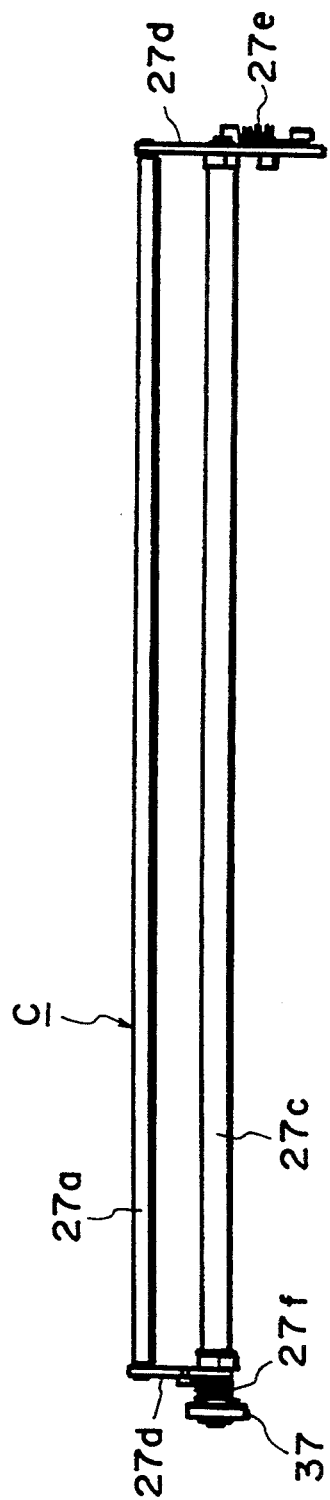
FIG. 11 is an illustration of a curl correct ion member.

The recording sheet 14 drawn out from the sheet roll 14a, when it passes the de-curl shaft 27a and guide shaft (curl correction member) 27b, is directed while being curved in the direction opposite to the direction of curl, whereby the curl of the recording sheet is corrected. The de-curl shaft 27a, as shown in FIG. 11, has its opposite end portions supported by arms 27d pivotable about a rotary shaft 27c, and the arms 27d are biased in a counter-clockwise direction shown in FIG. 1 by a tension spring 27e. The rotary shaft 27c is designed to be rotated to transmit and not transmit the drive force from the drive source through a spring clutch 27f.

(Recording Means)

The recording means 16 for recording predetermined images on the recording sheet 14 will hereinafter be described with reference to FIGS. 1, 12 and 13. In the present embodiment, as a recording head 16a, use is made of a thermal head of the so-called line type comprising a number of heat generating elements generating heat upon electrical energization and arranged on a surface which contacts with the recording sheet 14 in the widthwise direction of the recording sheet 14, and electrical energization conforming to image information is effected on the heat generating elements to thereby selectively heat or color-develop the recording sheet 14, thus accomplishing recording.

Figure 13:
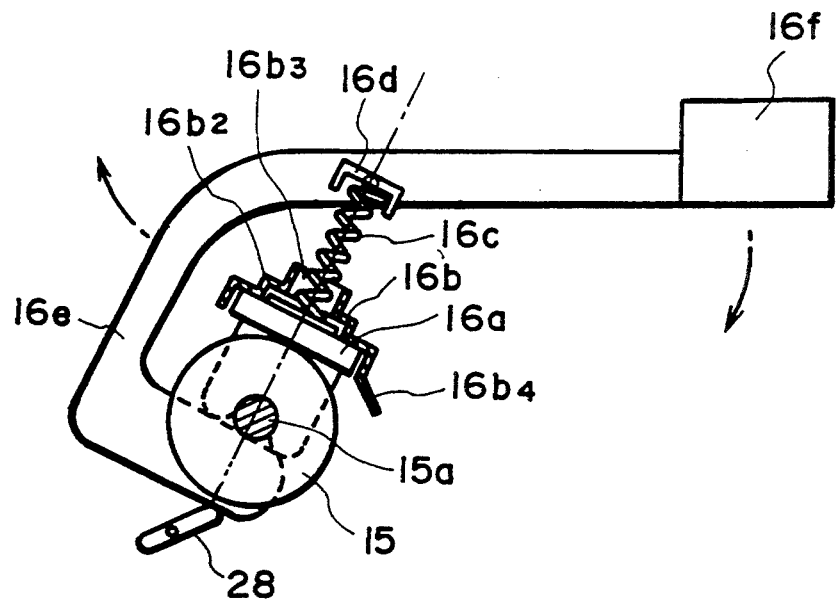
FIG. 13 is an illustration of a recording head holding mechanism.

The recording head 16a is held by a recording head holder 16b, as shown in FIGS. 12A, 12B and 12C, and 13, and this recording head holder 16b has attached thereto one end of a coil spring (a resilient member) 16c for urging the recording head 16a against the platen roller 15. The other end of the coil spring 16c is supported by a support member 16d having a laterally extending U-shaped cross-section in the lengthwise direction thereof. The recording head holder 16b and the support member 16d are connected together by a restraining member 16b₁ which is provided on the holder 16b being restrained by the support member 16d. Also, a portion 16b₄ of the recording head holder 16b is protrudingly formed as shown in FIG. 13, and this portion functions as a guide for the recording sheet 14 as it goes toward the cutter 17.

Lock pawls (lock members) 16e which can be restrained on the rotary shaft 15a of the platen roller 15 mounted on the apparatus body cover 2 side are integrally mounted on the opposite end portions of the support member 16d. Rotatable rollers 15b formed of a resin material are fitted at the locations on the rotary shaft 15a whereat the lock pawls 16e are restrained. By the lock pawls 16e being restrained on the rollers 15b, the recording head 16a can be urged against the platen roller 15 by the coil spring 16c. An unlocking button 16f exposed to a portion of the lid member 1 and capable of releasing the restraint of the lock pawls 16e with respect to the rotary shaft 15a is provided on one end of one of the lock pawls 16e. When the unlocking button 16f is depressed to release the restraining state of the lock pawls 16e on the rollers 15b, the unlocking button 16f is restored to its state before depressed by the resiliency of the coil spring 16c. Further, design is made such that the portion of the coil spring 16c which bears against the support member 16d, the portion of the coil spring 16c which urges the recording head 16a and the portion of the platen roller 15 against which the recording head 16a is urged are arranged substantially on a straight line.

According to the above-described construction, a reaction force applied to one end of the coil spring 16c is received by the support member 16d and therefore, it is not necessary to provide a metal sheet on the inner top surface of the lid member as in the prior art, and the resonation of the noise by the metal sheet during recording can be prevented. Also, by the direction of bias by the coil spring 16c being confined straightly, the pressure force of the coil spring 16c can be set easily and reliably without distorting the other members. Further, the recording sheet 14 is guided by a portion of the recording head holder 16b or the restoration of the unlocking button 16f to its original state is effected by the coil spring 16c which urges the recording head 16a, whereby the number of parts can be decreased to achieve a reduction in cost.

Also, that portion of the recording head holder 16b on which the coil spring 16c is mounted, as shown in FIG. 13, communicates with a slip-off preventing recess 16b₂ and is formed by a guide cylinder portion 16b₃ smaller in diameter than the recess 16b₂, and one end portion of the coil spring 16c is made smaller than the inner diameter of the recess 16b₂ and larger than the inner diameter of the guide cylinder portion 16b₃.

According to the above-described construction, the coil spring 16c can be mounted on the recording head holder 16b simply by inserting it through the recess 16b₂, and its mountability is improved very much as compared with a case where it is connected by being hitched onto a turned-up portion of the metal sheet on the holder side or the lid member 1 side as in the prior art. Also, the coil spring 16c has its directionality determined by the guide cylinder portion 16b₃ and therefore, the direction of bias of the recording head 16a by the coil spring 16c can be determined easily. Also, the recording head 16a, the recording head holder 16b, the coil spring 16c, the support member 16d, the lock pawls 16e and the unlocking button 16f are mounted by projections 16e₁ which are projectedly provided on both sides of the lock pawls 16e mounted on the opposite ends of the support member 16d being fitted into mating apertures (not shown) formed in the back side of the lid member 1.

Figure 14:
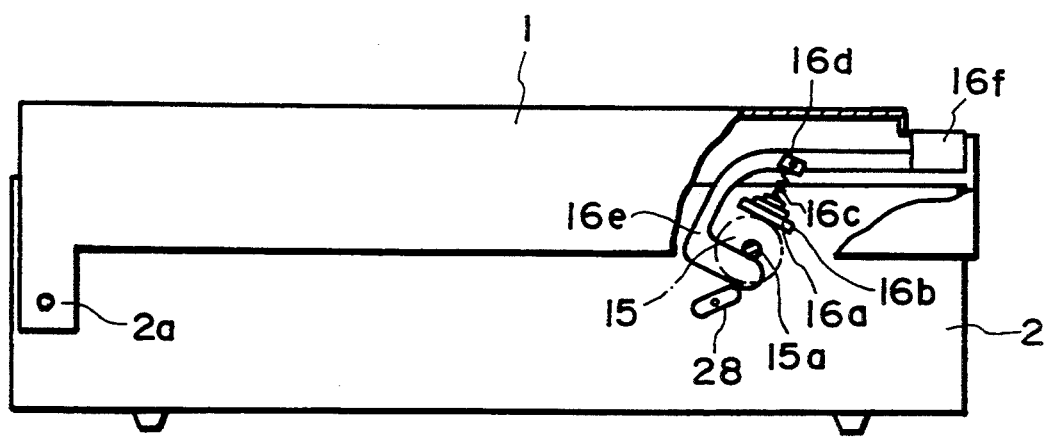
FIG. 14 is an illustration of a structure for detecting the opened and closed states of the lid member and the apparatus body cover.

Also, as shown in FIG. 14, an actuator (detecting means) 28 for detecting that the lock pawls 16e have been restrained or released from restraint is provided near that end of the rotary shaft 15a of the platen roller 15 of the apparatus body cover 2 which is adjacent to the recording drive unit. This actuator 28 is rotated to turn on or off a sensor (not shown) to thereby detect the opened or closed state of the lid member 1.

Accordingly, even when the lid member 1 or the apparatus body cover 2 is distorted, the actuator 28 detects the restraint or the release from the restraint of the lock pawls 16e, whereby the opened or closed state of the lid member 1 and the apparatus body cover 2 can be detected reliably. Also, since design is made such that the lock pawls 16e are restrained on the rotary shaft 15a of the platen roller, it becomes unnecessary to provide any special lock shaft for the lock pawls 16e to be restrained and thus, the number of parts and the number of assembly steps can be decreased to achieve a reduction in cost. Further, the provision of the rollers 15b on the rotary shaft 15a of the platen roller 15 leads to the possibility of smoothly accomplishing the restraint and the release from the restraint of the lock pawls 16e.

The platen roller 15 is formed of a material of high coefficient of friction such as hard rubber and rotatably journalled to the apparatus body cover 2, and is designed to be driven by a drive source which will be described later. As shown in FIG. 12, a jam releasing lever 29 is removably mounted on that end portion of the rotary shaft which is opposite to the recording drive unit having the drive source for the platen roller 15.

(Cutter)

Figure 15:
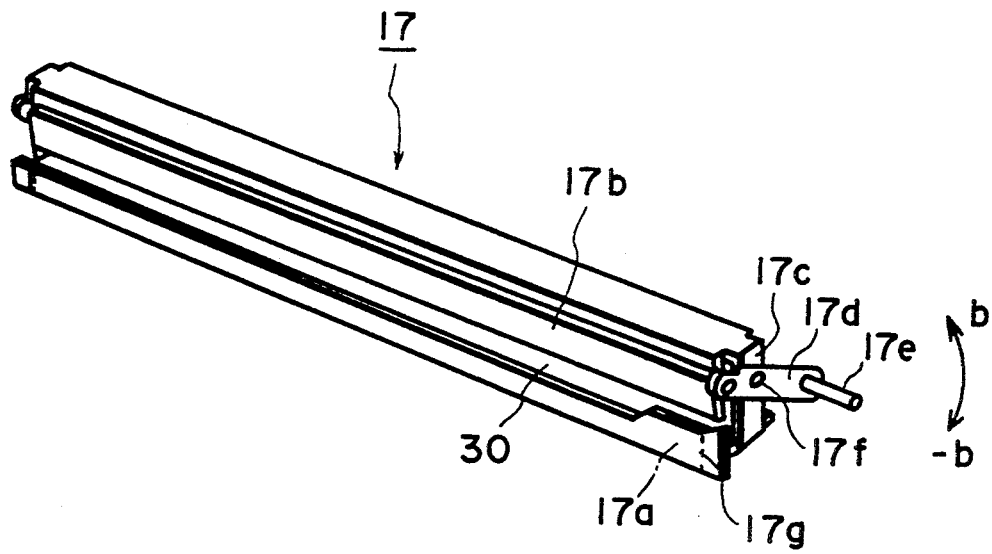
FIG. 15 is a perspective view showing the structure of a cutter.

The cutter 17, as shown in FIG. 15, is comprised of a fixed cutting edge 17a and a rotatable cutting edge 17b. The fixed cutting edge 17a, although shown behind a guide member 30 which provides a lower guide for the recording sheet 14, is mounted on a cutter frame 17c together with the guide member 30. The rotatable cutting edge 17b is fixedly and integrally supported on one end of a cutter arm 17d mounted on both sides of the cutter frame 17c for rotation about a pin 17f. A pin 17e is projectedly provided on the other end of the cutter arm 17d, and this pin 17e is connected to the recording drive unit which will be described later.

The lengthwise end portion of the rotatable cutting edge 17b protrudes from the end portion 17g of the fixed cutting edge 17a by an amount corresponding to the thickness of the frame 17c. but in the present embodiment, the guide member 30 is protruded from the lengthwise end portion 17g of the rotatable cutting edge 17b, whereby the user is prevented from touching the rotatable cutting edge 17b by mistake.

(Recording Drive Unit)

The recording drive unit including the drive source for the recording apparatus will now be described with reference to FIG. 16.

The reference numeral 31 designates a recording motor (drive source) such as a pulse motor. By this recording motor 31 being rotatively driven in formed and reverse directions, the platen roller 15, the cutter 17 and the de-curl shaft 27a can be driven as will be described later. A motor gear 32 connected to the recording motor 31 is in mesh engagement with an intermediate gear 33a, and an intermediate gear 33b provided coaxially with and rotatable with the intermediate gear 33a is in mesh engagement with an intermediate gear 33c. The intermediate gear 33c in turn is in mesh engagement with a first platen gear 34 rotatably mounted on one end portion of the rotary shaft 15a of the platen roller 15. A second platen gear 35 smaller in diameter than the first platen gear 34 is integrally mounted on the rotary shaft 15a.

Figure 17:
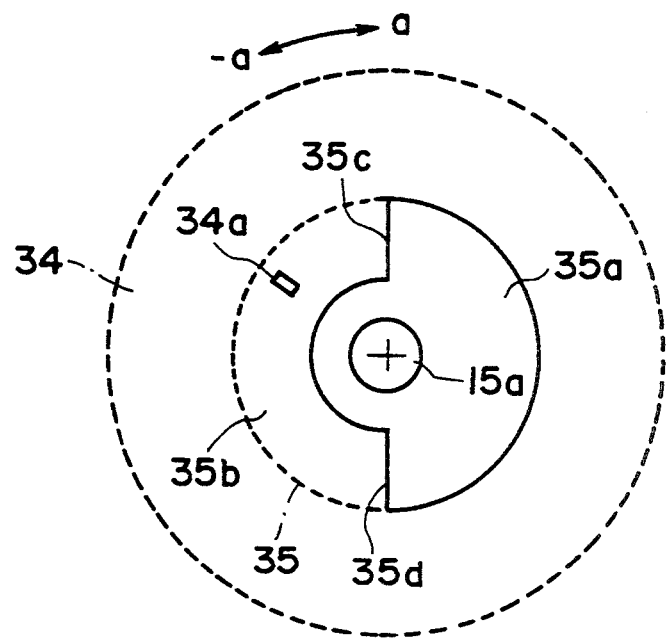
FIG. 17 is an illustration showing the drive force transmitting structure of a first platen gear and a second platen gear.

As shown in FIG. 17, the construction of the opposed sides of the first platen gear 34 and the second platen gear 35 is such that a projection 34a is projectedly provided on the first platen gear 34 side and a disk-shaped projection 35a formed with a cut-away portion 35b over a predetermined length is projectedly provided on the second platen gear 35 side, said projection 34a and said disk-shaped projection 35a together constituting drive transmitting means.

Accordingly, when the first platen gear 34 is rotated in the direction of arrow a during the forward driving (the rotation in the direction of arrow in FIG. 16) of the recording motor 31, the projection 34a strikes against the cut-away end portion 35c of the disk-shaped projection 35a, whereby the disk-shaped projection 35a is rotated with the second platen gear 35 to thereby rotatively drive the platen roller 15 in the direction of arrow a. Also, during the reverse driving of the recording motor 31, the first platen gear 34 is rotated in the direction of arrow -a, and as long as the projection 34a rotates the cut-away portion 35b, the second platen gear 35 is in its stationary state, and when the projection 34a strikes against the cut-away end portion 35d of the disk-shaped projection 35a after a predetermined time interval, the disk-shaped projection 35a is rotated with the second platen gear 35 to thereby rotatively drive the platen roller 15 in the direction of arrow -a.

The second platen gear 35 is in mesh engagement with an intermediate gear 36, which in turn is in mesh engagement with a de-curl gear 37 mounted on one end of the rotary shaft 27c of the arm 27d supporting the de-curl shaft 27a, with a spring clutch interposed therebetween. Also, the first platen gear 34 is in mesh engagement with an intermediate gear 38 which is mounted coaxially with an intermediate gear 39 of a small diameter, and the intermediate gears 38 and 39 are connected together with a one-way clutch 40 interposed therebetween, as shown in FIG. 18.

Figure 16:
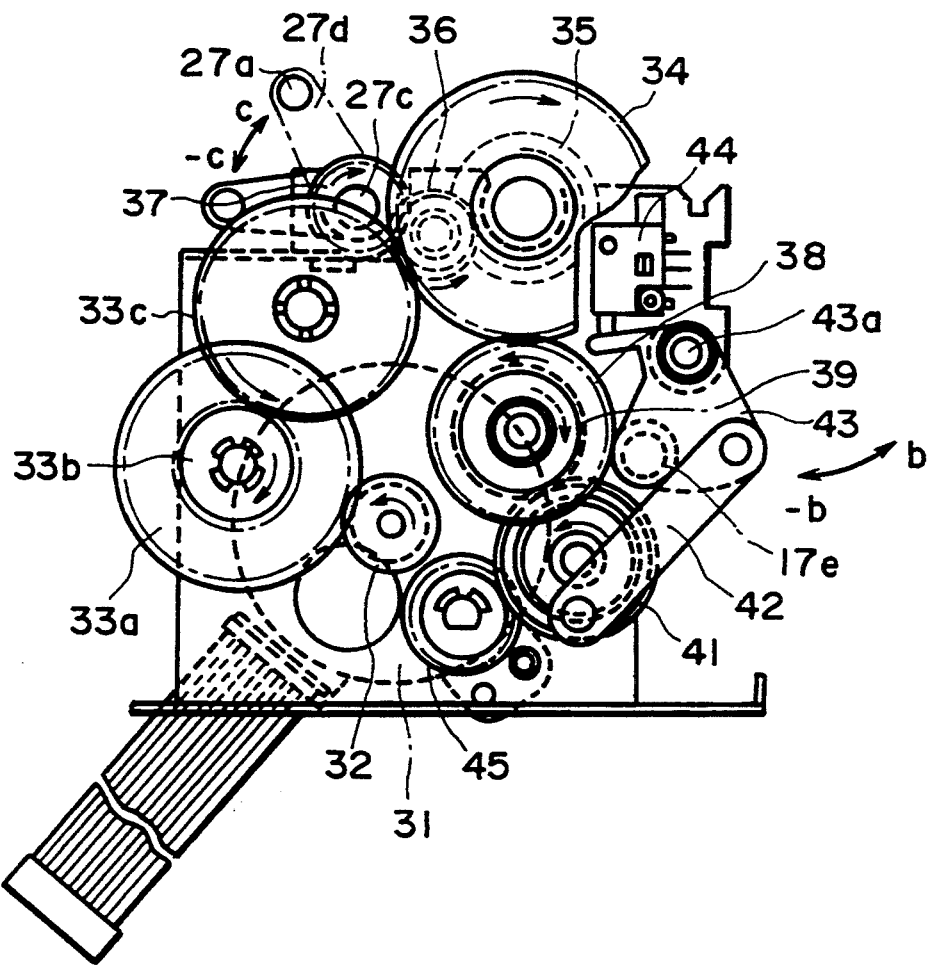
FIG. 16 is an illustration of a recording drive unit.

This one-way clutch 40 is such that when the recording motor 31 is driven in the forward direction and the intermediate gear 38 is rotated in the direction of arrow indicated in FIG. 16, a clutch spring 40a loosens and does not transmit the drive force to the intermediate gear 39 and that when the recording motor 31 is driven in the reverse direction and the intermediate gear 38 is rotated in the direction of arrow indicated by a broken line in FIG. 16, the clutch spring 40a tightens and transmits the drive force to the intermediate gear 39 to rotate a cutter gear 41 which is in mesh engagement with the intermediate gear 39 in the direction of arrow indicated by a broken line.

The cutter gear 41 and a sectoral actuator 43 connected to the pin 17e projectedly provided on the cutter arm 17d are connected together by a link 42. Accordingly, when the cutter gear 41 is rotated in the direction of arrow indicated by a broken line in FIG. 16, the sectoral actuator 43 is also pivotally moved in the directions of arrows b and -b about a fulcrum 43 through the link 42 and at the same time, the rotatable cutting edge 17b connected to the cutter arm 17d is reciprocally moved to thereby cut the recording sheet 14. The reference numeral 44 denotes a microswitch for detecting the return of the sectoral actuator 43 to its home position (its standby position), and the reverse driving operation of the recording motor 31 is stopped by the detection signal of this microswitch.

Figure 18:
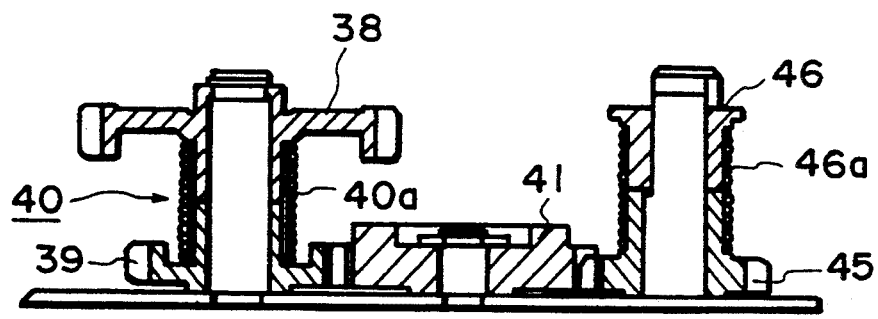
FIG. 18 is an illustration of a one-way clutch for effecting the drive control of a cutter gear.

A brake gear 45 is in mesh engagement with the cutter gear 41, and as shown in FIG. 18, a one-way clutch 46 is mounted on the brake gear 45 to thereby prevent the cutter gear 41 from being rotated with the recording motor 31 during the forward driving of the recording motor. Also, design is made such that a clutch spring 46a loosens and rotates freely when the cutter gear 41 is rotated in the direction of arrow indicated by a broken line in FIG. 16 during the reverse driving of the recording motor 31.

The operation of the recording drive unit will now be described. When the recording operation is started, the recording motor 31 is forwardly driven in the direction of arrow indicated in FIG. 16 and the first platen gear 34 is rotated in the direction of arrow (the clockwise direction), whereby the projection 34a shown in FIG. 17 is rotated in the direction of arrow a and strikes against the cut-away end portion 35c of the projection 35a and is rotated with the second platen gear 35 and thus, the platen roller 15 is rotated in the same direction to convey the recording sheet 14 toward the downstream side.

Simultaneously with the rotation of the gear 34, the de-curl gear 37 is rotated in the direction of arrow (the clockwise direction) through the intermediate gear 36, whereby the arm 27d holding the de-curl shaft 27a is rotated in the direction of arrow c about the rotary shaft 27c to thereby cause the recording sheet 14 to bear against the de-curl shaft 27a and curve the recording sheet in the direction opposite to the direction of curl, thereby conveying the recording sheet while correcting its curl. When the de-curl shaft 27a is rotated to a predetermined position, the spring of the spring clutch loosens and slippage occurs between the de-curl gear 37 and the arm 27d, and the arm 27d is not rotated any more. The intermediate gear 38 which is in mesh engagement with the first platen gear 34 is rotated in the direction of arrow (the counter-clockwise direction), but since the drive force is not transmitted to the intermediate gear 39 by the one-way clutch 40, the cutter 17 is not driven but is in its stationary state.

The recording of one page or one communication on the recording sheet 14 is then terminated, and that portion of the sheet which is to be cut is conveyed to the position of the cutter, whereafter the recording motor 31 is reversely driven in the direction opposite to the direction of arrow indicated in FIG. 15, whereby the first platen gear 34 is rotated in the direction opposite to the direction of arrow (the counter-clockwise direction). At this time, the first platen gear 34 is rotated in the direction of arrow -a indicated in FIG. 17 and therefore, as long as the projection 34a moves the cut-away portion 35b, the drive force is not transmitted to the second platen gear 35 and the drive force is neither transmitted to the arm 27d supporting the de-curl shaft 27a.

The intermediate gear 38 which is in mesh engagement with the first platen gear 34 is rotated in the direction opposite to the direction of arrow in FIG. 16 (the clockwise direction) while the projection 34a of the first platen gear 34 rotates the cut-away portion 35b in the direction of arrow -a, and at the same time, the drive force is transmitted to the intermediate gear 39 through the one-way clutch 40 to rotate the intermediate gear 39 in the direction of arrow indicated by a broken line in FIG. 16 (the clockwise direction). At this time, the brake gear 45 rotates freely relative to the one-way clutch 46 and therefore rotates the cutter gear 41 in the direction of arrow indicated by a broken line (the counter-clockwise direction) to thereby rotate the sectoral actuator 43 in the direction of arrow b through the intermediary of the link 42, whereby the rotatable cutting edge 17b rotates the cutter arm 17d in a direction to overlap with the fixed cutting edge 17a (the direction of arrow b in FIG. 15), thus cutting the recording sheet 14 (the forward course).

When after the cutting of the recording sheet, the projection 34a of the first platen gear 34 strikes against the cut-away end portion 35d of the projection 35a shown in FIG. 17, the second platen gear 35 is rotated in the direction opposite to the direction of arrow (the counter-clockwise direction) with the first platen gear 34. At this time, the intermediate gear 36 which is in mesh engagement with the second platen gear 35 and the de-curl gear 37 which is in mesh engagement with the intermediate gear 36 are rotatively driven in the direction opposite to the direction of arrow, and the arm 27d supporting the de-curl shaft 27a is rotated in the direction of arrow -c in FIG. 16 about the rotary shaft 27c and becomes spaced apart from the recording sheet 14 to move the recording sheet to its standby position.

At the same time, the cutter 17 which has cut the recording sheet 14 by the rotatable cutting edge 17b rotates the cutter gear 41 in the direction of arrow indicated by a broken line in FIG. 16 (the counter-clockwise direction) by further reverse driving of the recording motor 31 to thereby rotate the sectoral actuator 43 in the direction of arrow -b through the link 42 and rotate the cutter arm 17d in a direction in which the rotatable cutting edge 17b comes away from the fixed cutting edge 17a (the direction of arrow -b in FIG. 15), thus returning the rotatable cutting edge 17b to the standby position for cutting (the backward course).

When the rotatable cutting edge 17b is returned to the standby position for cutting, the sectoral actuator 43 actuates the microswitch 44 to thereby stop the reverse driving of the recording motor 31. At this time, the leading end portion of the recording sheet 14 after cut is reversely conveyed to the recording start position downstream of the portion in which the recording head 16a is urged against the platen roller 15, by the reverse driving of the platen roller 15, thus assuming the standby position for recording.

According to the above-described construction, when the cutter 17 is to be driven by the recording motor 31 for driving the platen roller 15 for conveying the recording sheet 14 and the returning operation for the recording sheet 14 and the cutting operation of the cutter 17 are to be performed by the reverse driving of the recording motor 31, it is not necessary to use an electromagnetic clutch as in the prior art and therefore, the control of each member can be simplified. In order to effect such control, provision is made of a microprocessor for controlling the recording motor 31 on the basis of communication data and the operation of the microswitch 44.

Also, it is possible to drive the platen roller 15 for conveying the recording sheet 14, the cutter 17 and the de-curl shaft 27a by the single recording motor 31 and therefore, the number of parts can be decreased to achieve a reduction in cost.

Further, even if the recording sheet 14 is jammed at the platen roller 15 or the cutter 17, the jam releasing lever 29 provided on the side edge portion opposite to the drive source for the rotary shaft 15a can be gripped and rotated to thereby rotate the platen roller 15 and operate the cutter 17 simultaneously therewith. Thus, it becomes possible to cut and remove the jammed recording sheet 14 or to rotate the platen roller 14 and remove the jammed recording sheet 14 with the nose of the cutter 17 opened, and jam can be dealt with easily and with the safety of the apparatus secured.

In the above-described embodiment, the thermosensitive recording system has been shown as the recording means, whereas the recording means need not be restricted thereto, but use may be made of other recording system such as the heat transfer recording system using an ink sheet.

In the present invention, as described previously, the cutter is driven by the drive source for driving the conveying member for the recording medium, and the returning operation for the recording medium and the cutter driving operation are to be performed by the reverse driving of the drive source, it is not necessary to use an electromagnetic clutch as in the prior art and therefore, the control of each member can be simplified. Also, it becomes possible to drive the conveying member for conveying the recording medium, the cutter and the curl correction member by the single drive source and thus, it becomes possible to decrease the number of parts and thereby achieve a reduction in cost. Further, since the guide member is protruded more than the lengthwise end portion of the cutting edge of the cutter, there is no possibility of touching the end portion of the cutting edge of the cutter.

What is claimed is:

1. A recording apparatus, comprising:
   a conveying member for conveying a sheet;
   recording means for recording an image on the sheet conveyed by said conveying member;
   a cutter disposed downstream of said recording means for cutting the sheet conveyed by said conveying member;
   a drive source rotatable in a forward and a reverse direction;
   drive force transmitting means for transmitting a drive force to said conveying member during the forward rotation of said drive source, and transmitting the drive force to said conveying member after a predetermined amount of reverse rotation of said drive source so as to await cutting of the sheet by said cutter;
   a one-way clutch which does not transmit the drive force to said cutter during the forward rotation of said drive source, and transmits the drive force to said cutter to operate said cutter during the reverse rotation of said drive source; and
   curl correcting means to correct for curling of the sheet, including means for shifting said curl correcting means to an operating position in response to the forward rotation of said drive source to correct for curling of the sheet, and for shifting to a non-operating position in response to the reverse rotation of said drive source so as not to correct for the curling of the sheet.

2. A recording apparatus according to claim 1, wherein said conveying member includes a roller.

3. A recording apparatus according to claim 1, wherein said recording means has a plurality of heat generating elements.

4. A recording apparatus according to claim 1, wherein said cutter has a rotatable cutting blade rotated by the drive force during the reverse rotation of said drive source which is transmitted through said one-way clutch.

5. A recording apparatus according to claim 1, wherein said drive source has a motor.

6. A recording apparatus according to claim 1, wherein said drive force transmitting means has a first rotatable member connected to a drive source side, and a second rotatable member connected to a conveying member side, said second rotatable member being freely rotatable by a predetermined angle relative to said first rotatable member.

7. A recording apparatus according to claim 6, wherein said second rotatable member has regulating means for regulating the predetermined angle relative to said first rotatable member.

8. A recording apparatus according to claim 7, wherein said regulating means comprises a projection formed on said first rotatable member, and a bearing member formed on said second rotatable member and adapted to bear against said projection to thereby regulate the range of movement of said projection relative to said second rotatable member.

9. A recording apparatus according to claim 1, wherein said predetermined amount of reverse rotation allows for said recording means to terminate recording.

10. A recording apparatus according to claim 9, wherein said predetermined amount of reverse rotation of said drive source to said conveying member allows for said cutter to terminate the cutting of the sheet.

11. A recording apparatus according to claim 10 wherein after said drive force transmitting means transmits the reverse drive force of said drive source to said conveying member the sheet is conveyed in a reverse direction until the leading end thereof comes to a predetermined position.

12. A recording apparatus according to claim 1, wherein said recording means records the image based on the image information received.

13. A recording apparatus according to claim 12, wherein said drive source rotates in the reverse direction after the recording of one communication of image information.

14. A sheet conveying apparatus, comprising:
a conveying member for conveying a sheet;
a cutter for cutting the sheet conveyed by said conveying member;
a drive source rotatable in a forward direction and a reverse direction;
drive force transmitting means for transmitting a drive force to said conveying member during the forward rotation of said drive source, and transmitting the drive force to said conveying member after a predetermined amount of reverse rotation of said drive source so as to await cutting of the sheet by said cutter;
an one-way clutch which does not transmit the drive force to said cutter during the forward rotation of said drive source, and which transmits the drive force to said cutter to operate it during the reverse rotation of said drive source; and
curl correcting means to correct for curling of the sheet, including means for shifting said curl correcting means to an operating position in response to the forward rotation of said drive source to correct for curling of the sheet, and for shifting to a non-operating position in response to the reverse rotation of said drive source so as not to correct for the curling of the sheet.

15. A sheet conveying apparatus according to claim 14, wherein said conveying member includes a roller.

16. A sheet conveying apparatus according to claim 14, wherein said cutter has a rotary blade that is rotatable by the drive force transmitted via said one-way clutch upon the reverse rotation of said drive source.

17. A sheet conveying apparatus according to claim 14, wherein said drive source has a motor.

18. A sheet conveying apparatus according to claim 14, further comprising record means for recording an image on the sheet conveyed by said conveying member.

19. A sheet conveying apparatus according to claim 18, wherein said drive source rotates in the reverse direction to operate said cutter after said record means has completed recording.

20. A facsimile apparatus for recording an image based on received image information, comprising:
a conveying member for conveying a sheet;
recording means for recording the image based on the received image information on the sheet conveyed by said conveying member;
a cutter for cutting the sheet conveyed by said conveying member;
a drive source rotatable in a forward direction and a reverse direction;
drive force transmitting means for transmitting a drive force to said conveying member during the forward rotation of said drive source, and transmitting the drive force to said conveying member after a predetermined amount of reverse rotation of said drive source so as to await cutting of the sheet by said cutter;
an one-way clutch which does not transmit the drive force to said cutter during the forward rotation of said drive source, and transmits the drive force to said cutter to operate it during the reverse rotation of said drive source; and
curl correcting means to correct for curling of the sheet, including means for shifting said curl correcting means to an operating position in response to the forward rotation of said drive source to correct for curling of the sheet, and for shifting to a non-operating position in response to the reverse rotation of said drive source so as not to correct for the curling of the sheet.

21. A conveying apparatus, comprising:
a conveying member for conveying a sheet;
a cutter for cutting the sheet conveyed by said conveying member;
a drive source rotatable in a forward direction and a reverse direction;
an one-way clutch which does not transmit the drive force to said cutter during the forward rotation of said drive source, and transmits the drive force to said cutter to operate it during the reverse rotation of said drive source; and
curl correcting means to correct for curling of the sheet including means for shifting said curl correcting means to an operating position in response to the forward rotation of said drive source to correct for curling of the sheet, and for shifting to a non-operating position in response to the reverse rotation of said drive source so as not to correct for the curling of the sheet.

22. A conveying apparatus according to claim 21, further comprising recording means for recording an image on the sheet conveyed by said conveying means.

23. A recording apparatus according to claim 22, wherein said recording means records the image based on the image information received.

24. A conveying apparatus according to claim 22, wherein said drive source rotates in the reverse direction after the recording of the image on the sheet conveyed by said conveying means.

25. A conveying apparatus according to claim 23, wherein said drive source rotates in the reverse direction after recording of one communication of the image information.

26. A recording apparatus according to claim 21, further comprising drive force transmitting means for transmitting the forward rotation of said drive source to said shifting means to shift said curl correcting means to an operating position, and for transmitting the reverse rotation of said drive source to said shifting means to shift said curl correcting means to a non-operating position so as not to correct for curling of the sheet.

* * * * *

UNITED STATES PATENT AND TRADEMARK OFFICE
CERTIFICATE OF CORRECTION

PATENT NO. : 5,413,426
DATED : May 9, 1995
INVENTOR(S) : KAZUYA IJUIN, ET AL.

It is certified that error appears in the above-indentified patent and that said Letters Patent is hereby corrected as shown below:

Column [56] RC,
    line FPD, "1238969" should read --1-238969--; and
    "3284962" should read --3-284962--.
Column 2, "2171082" should read --2-171082--.
    line 13, "drive" should read --drive force--.
Column 3,
    line 4, "correct ion" should read --correction--.
Column 4,
    line 15, "De" should read --be--.
Column 6,
    line 22, "1" should be deleted.
Column 10,
    line 47, "frame 17c." should read --frame 17c,--; and
    line 59, "formed" should read --forward--.

UNITED STATES PATENT AND TRADEMARK OFFICE
CERTIFICATE OF CORRECTION

PATENT NO. : 5,413,426
DATED : May 9, 1995
INVENTOR(S) : KAZUYA IJUIN, ET AL.

It is certified that error appears in the above-indentified patent and that said Letters Patent is hereby corrected as shown below:

<u>Column 15</u>,
    line 33, "claim 10" should read --claim 10,--;
    line 36, "member" should read --member,--; and
    line 59, "an" should read --a--.
<u>Column 16</u>,
    line 37, "an" should read --a--; and
    line 56, "an" should read --a--.

Signed and Sealed this

Twenty-sixth Day of September, 1995

Attest:

BRUCE LEHMAN

*Attesting Officer*      *Commissioner of Patents and Trademarks*